(12) United States Patent
Pryor

(10) Patent No.: US 6,545,670 B1
(45) Date of Patent: Apr. 8, 2003

(54) METHODS AND APPARATUS FOR MAN MACHINE INTERFACES AND RELATED ACTIVITY

(76) Inventor: Timothy R. Pryor, 416 Old Tecumsch Road, Tecumseh, Ontario N8N 3S8 (CA)

( * ) Notice: Subject to any disclaimer, the term of this patent is extended or adjusted under 35 U.S.C. 154(b) by 0 days.

(21) Appl. No.: 09/568,554

(22) Filed: May 11, 2000

Related U.S. Application Data

(60) Provisional application No. 60/133,673, filed on May 11, 1999.

(51) Int. Cl.7 .................................................. G09G 5/00
(52) U.S. Cl. ....................... 345/173; 345/156
(58) Field of Search ................ 345/173, 179, 345/156; 463/51, 52, 36; 273/358

(56) References Cited

U.S. PATENT DOCUMENTS

| | | | | |
|---|---|---|---|---|
| 3,748,751 A | * | 7/1973 | Breglia et al. ................. 463/51 |
| 3,757,322 A | * | 9/1973 | Barkan et al. ............... 345/173 |
| 4,017,848 A | * | 4/1977 | Tannas, Jr. .................. 345/173 |
| 4,772,028 A | * | 9/1988 | Rockhold et al. ............. 463/36 |
| 4,948,371 A | * | 8/1990 | Hall .............................. 434/21 |
| 5,328,190 A | * | 7/1994 | Dart et al. ................... 273/358 |
| 5,495,269 A | * | 2/1996 | Elrod et al. .................. 345/179 |
| 5,502,514 A | | 3/1996 | Vogeley et al. |
| 5,515,079 A | | 5/1996 | Hauck |
| 5,613,913 A | * | 3/1997 | Ikematsu et al. ............. 463/52 |
| 5,649,706 A | * | 7/1997 | Treat, Jr. et al. ............ 273/358 |
| 5,982,352 A | * | 11/1999 | Pryor .......................... 345/156 |
| 6,008,800 A | * | 12/1999 | Pryor .......................... 345/173 |
| 6,339,748 B1 | * | 1/2002 | Hiramatsu ................... 345/156 |
| 6,441,807 B1 | * | 8/2002 | Yamaguchi ................. 345/173 |
| 2001/0012001 A1 | * | 8/2001 | Rekimoto et al. .......... 345/173 |

* cited by examiner

Primary Examiner—Bipin Shalwala
Assistant Examiner—David L. Lewis
(74) Attorney, Agent, or Firm—Larson & Taylor PLC

(57) ABSTRACT

Disclosed herein are new forms computer monitors and displays, and preferred embodiments utilize electro-optical sensors, and particularly TV Cameras, providing optically inputted data from the display screen or from specialized datum's on objects and/or natural features of objects, which may be illuminated using specialized light sources, such as laser pointers. The invention is a continuation of earlier applications aimed at providing affordable methods and apparatus for data communication with respect to people and computers.

17 Claims, 7 Drawing Sheets

METHODS AND APPARATUS FOR MAN MACHINE INTERFACES AND RELATED ACTIVITY

This application claims benefit of U.S. Provisional Application No. 60/133,673 filed May 11, 1999.

CROSS REFERENCES TO RELATED CO-PENDING APPLICATIONS BY THE INVENTOR

1. Touch TV and other Man Machine Interfaces, Ser. No. 09/435,854.
2. More Useful Man Machine Interfaces and applications Ser. No. 09/433,297.
3. Target holes and corners U.S. Ser. Nos. 08/203,603, and 08/468,358.
4. Useful Man Machine interfaces and applications, Ser. No. 09/138,339.
5. Vision Target based assembly, U.S. Ser. Nos. 08/469,429, 08/469,907, 08/470,325, 08/466,294.
6. Camera based Applications of man machine interfaces (U.S. provisional application No. 60/142,777).
7. Picture Taking method and apparatus(U.S. provisional application No. 60/133,671 filed May 11, 1999).
8. Tactile Touch Screens for Automobile Dashboards, Interiors and Other Applications.
9. Apparel Manufacture and Distance Fashion Shopping in Both Present and Future, filed March 2000.

The disclosures of the above referenced applications are incorporated herein by reference.

FEDERALLY SPONSORED R AND D STATEMENT not applicable

MICROFICHE APPENDIX not applicable

The disclosures of the following U.S. patents and co-pending patent applications are incorporated herein by reference:

1. U.S. Pat. No. 4,629,319 (Panel Surface Flaw inspection, which discloses a novel optical principle commonly called "D Sight").
2. U.S. Ser. No. 09/435,854 and U.S. Pat. No. 5,982,352, and U.S. Ser. No. 08/290,516 ("Man Machine Interfaces"), filed Aug. 15, 1994, now U.S. Pat. No. 6,008,000, the disclosure of both of which is contained in that of Ser. No. 09/435,854.
3. U.S. application Ser. No. 09/138,339 Useful man machine interfaces and applications.
4. U.S. application Ser. No. 09/433,297 More useful man machine interfaces and applications.

PROVISIONAL PATENT APPLICATIONS

5. Camera Based Applications of Man—Machine Interfaces U.S. Ser. No. 60/142,777.
6. Picture Taking method and apparatus U.S. No. 60/133,671.
7. Methods and Apparatus for Man Machine Interfaces and Related Activity U.S. No. 60/133,673.
8. Tactile Touch Screens for Automobile Dashboards, Interiors and Other Applications, Ser. No. 60/183,807, filed Feb. 22, 2000.
9. Apparel Manufacture and Distance Fashion Shopping in Both Present and Future, Ser. No. 60/187,397, filed Mar. 7, 2000.

BACKGROUND OF THE INVENTION

1. Field of the invention

The invention relates to simple input devices for computers, particularly, but not necessarily, intended for use with 3-D graphically intensive activities, and operating by optically sensing a human input to a display screen or other object and/or the sensing of human positions or orientations. The invention herein is a continuation in part of several inventions of mine, listed above.

This continuation application seeks to provide further detail on useful embodiments for computing. One embodiment is a monitor housing for a computer that integrally incorporates digital TV cameras to look at points on the hand or the finger, or objects held in the hand of the user, which are used to input data to the computer. It may also or alternatively, look at the head of the user as well.

Further disclosed are improved touch screens, and further discloses camera based sensing of laser pointer indications. The invention in several other embodiments, uses real time stereo photogrammetry or other methods using single or multiple TV cameras whose output is analyzed and used as input to a personal computer, typically to gather data concerning the 3D location of parts of, or objects held by, a person or persons.

2. Description of Related Art

The above mentioned co-pending applications incorporated by reference discuss many prior art references in various pertinent fields, which form a background for this invention.

Regarding use of laser pointers to signal or provide information to computers associated with TV displays, the closest reference I can find is U.S. Pat. No. 5,515,079 by Hauck "Computer input system and method of using same" (incorporated herein by reference). Hauck however, does not disclose function in a rear projection context as disclosed here.

Another reference which does use rear projection is U.S. Pat. No. 5,502,514 by Vogeley, et al, entitled "Stylus position sensing and digital camera with a digital micromirror device". This however can only be used with a DLP projector comprising such a device, and does not use the simple TV camera based sensing approach of the instant invention.

No reference I have been able to find discusses the unique aspects of the disclosed invention relative to human interaction based information and the ability of the input data from the aiming pointer to be spatially encoded.

THE INVENTION EMBODIMENTS

FIG. 1

Figure 1:
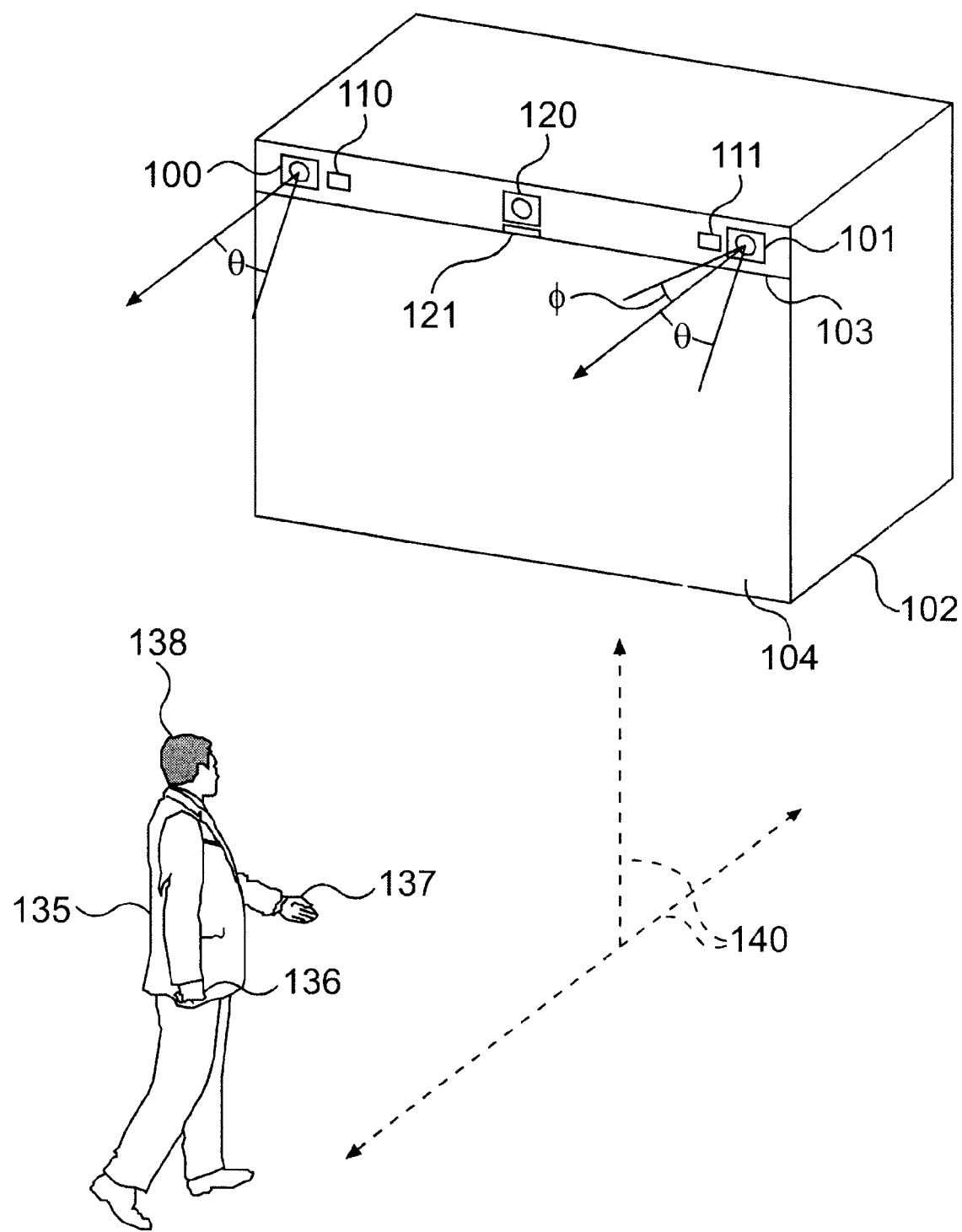
FIG. 1 illustrates a computer monitor of the invention integrally incorporating one or two cameras pointing outward from the surface of the Bezel facing the user to observe objects held by the user, or parts of the user such as fingers and hands, the bezel preferably including an opaque (to the user) plastic cover for both cameras and light sources. Also illustrated is an additional camera for viewing a user directly or other purposes.

This embodiment illustrating a computer display with camera(s) and illumination system is an alternative or addition to that of FIG. 1 of copending reference 3 above (Ser. No. 09/138,339).

A PC computer based embodiment is shown in FIG. 1a. In this case, a stereo pair of cameras 100 and 101 located on each side of the upper surface of monitor 102 (for example a rear projection TV having 80 inch diagonal screen 104) facing the user, desirably having one or more cover windows 103. In this case a single extensive cover window 103 is covering both cameras and their associated light sources 110 and 111, and mounted flush with the monitor front bezel surface. The LED's in this application are typically used to illuminate targets associated with the fingers, hand, head of the user, or objects held by the user, such as user 135 with hands 136 and 137, and head 138. These targets are desirably, but not necessarily, retro-reflective, and may be constituted by the object features themselves (e.g. a finger), or by features of clothing worn by the user, or by artificial targets other than retroreflectors.

The cameras are preferably pointed obliquely inward at angles theta, and downward, if desired, at further angles phi toward the center of the desired work volume 140 in front of the monitor, as required (angles depend on the computer monitor width, the distance of the work zone volume, 140, from the monitor etc.

Alternatively, or in addition, a single camera can be used, for determining user or other object positions such as 120 with light source 121, both also optionally located behind a cover window (such as 103).

The cover window 103 is preferably black or dark plastic which lets the LED light source wavelength pass easily, but attenuates sunlight or room lights, thus aiding camera signal to noise in many cases, and making the cameras and light sources substantially invisible to the user (especially if the light sources are in the near infrared) and thus pleasing to the eye and not distracting.

Alternate camera locations may be used such as in the sides of the monitor bezel, or anywhere desired, for example as appendages to the monitor. They may alternately or in addition, be at the rear of the keyboard in front of the monitor. In the case of cameras mounted at the rear of the keyboard (toward the display screen), these cameras are also inclined to point toward the user at an angle as well.

It is noted that an additional camera for viewing a user directly or other purposes may be employed. For example if a stereo pair such as 100 and 101 is utilized for position determination, then a third camera such as 120 might be used just for imaging using ambient illumination such as room lights (i.e. LED source 121 is not needed, though could be provided if desired) When this camera is located far enough spaced from the other two, then any light sources such as 110 and 111 located near the optical axes of the other two, do not generally illuminate any retro-reflectors in such a way as to register same on camera 120—due to the limited angular return characteristic of retro-reflectors.

FIG. 2

Figure 2:
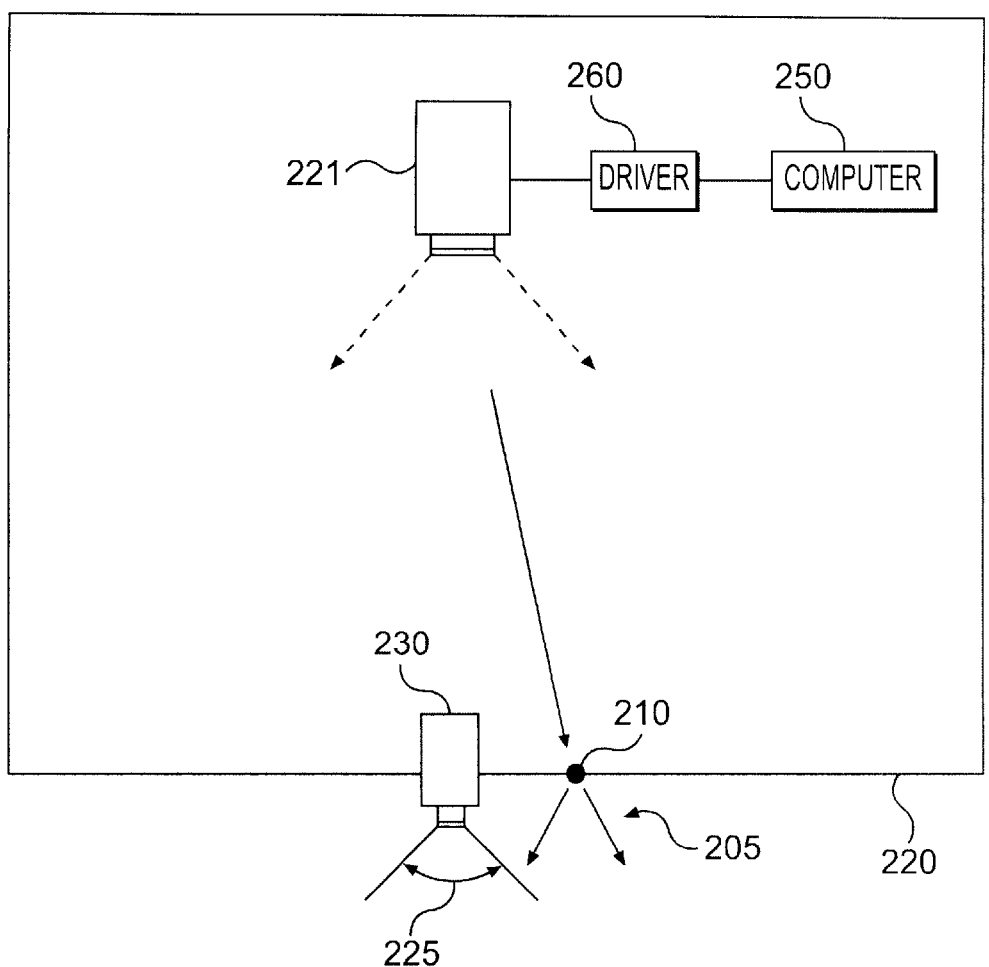
FIG. 2 illustrates a version of the invention wherein the light illuminating the target datums of the object is itself generated by the monitor viewed by the user or users, said monitor being of the CRT, LED, Projected light, scanned laser spot or any other variety.

FIG. 2 illustrates a version of the invention of the co-pending applications wherein the light illuminating the target datums of the object is itself generated by the monitor viewed by the user or users, said monitor being of the CRT, LED, Projected light, scanned laser spot or any other variety.

For example target 201 on finger 202 is illuminated by light 205 from zone 210 of screen 220 on which an image is projected by projection device 221 as shown. Light reflected by the target 201 is imaged by camera 230 such as that employed in the invention of FIG. 1 for example. The color of light 205, or the point (or points) 210 from which it emanates, may be varied by the program of computer 250 controlling screen display driver 260. The control of point location and color allows selective illumination of targets or object features such as finger tip 203, both by choice of color sensitivity response with respect to the target illuminated, and if the target is retroreflective, by choice of screen location with in the viewing field of view 225 of TV camera 230. This can be used to select, by choice of screen generated light source location which camera, for example of two cameras sees the target.

FIG. 3

Figure 3:
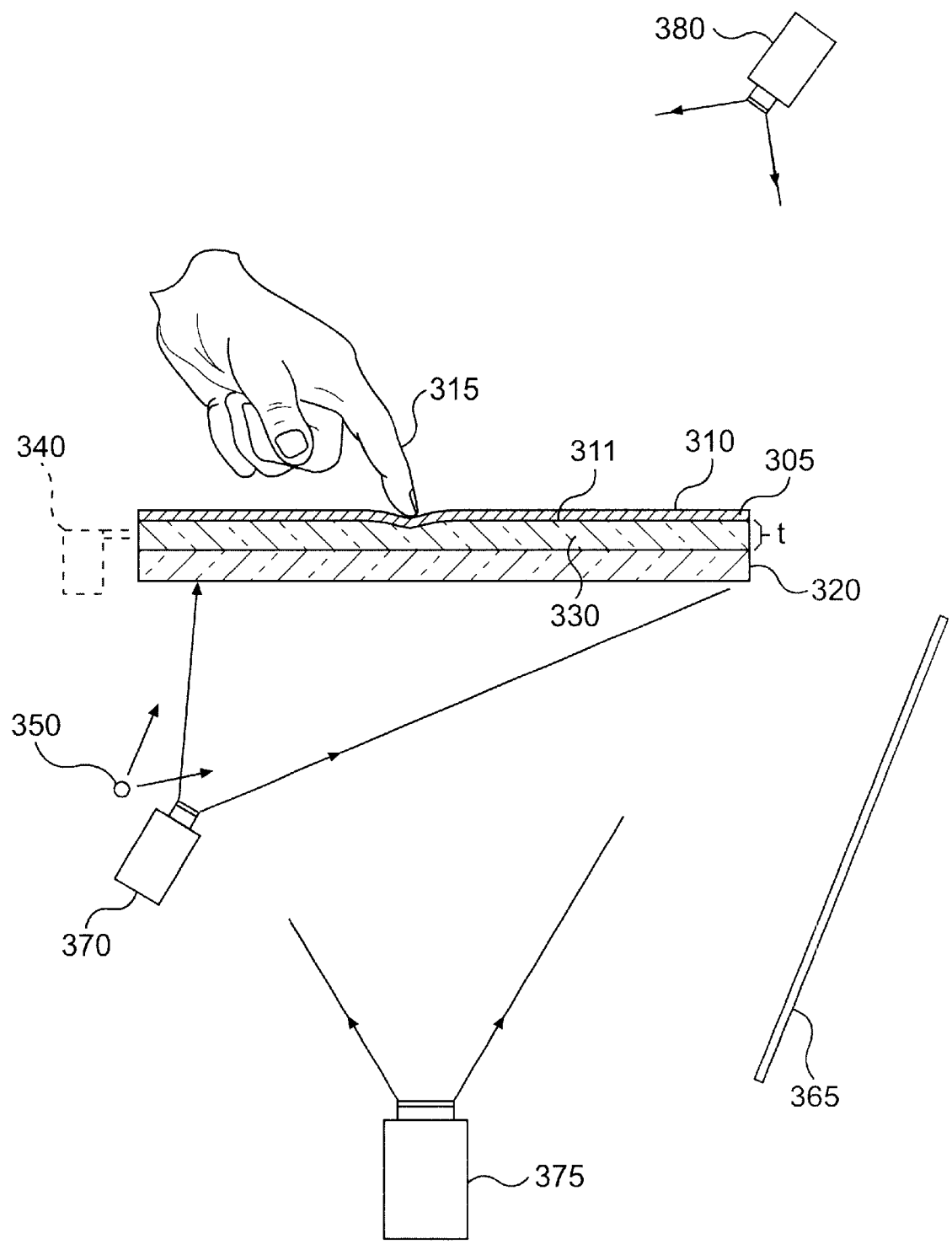
FIG. 3 illustrates a touch screen of the invention of co-pending application 1 referenced above, having improved screen rigidity. In this case, distortion of the screen occurs primarily in a zone that is able to distort, with the zone supported by a rigid backing member.

FIG. 3 illustrates a touch screen of the invention as in the co-pending invention 1 referenced above, having however, improved screen rigidity. In this case, distortion of the screen occurs primarily in a region that is able to distort or otherwise be changed, with the region supported by a rigid backing member.

For example consider transparent screen member 305 whose outer scattering surface 310 is touched, and locally distorted inward, by finger 315. This surface is separated from rigid (typically glass) backing member 320 by optically transparent refractive medium 330 of thickness t, which is compressed by the force of finger 315. Alternatively the medium 330 can be a liquid, such as water or alcohol, that is either compressed, or displaced temporarily into a reservoir such as 340 (dotted lines) for example.

Light from light source 350 from the rear passes through member 320 and is reflected off the back surface 311 of screen member 305. Desirably, but not necessarily, the index of refraction of member 320 and material 330 are closely matched such that little refraction occurs as light passes from 320 through 330 to surface 311 and back toward camera 370 (after retroreflection by expansive retroreflector 365 typically comprised of Scotchlight 7615 glass bead material) for example used to determine the distortion of 311 due to the retroreflective based "D sight" image effect or another optical phenomena such as disclosed in copending reference 1.

While primarily intended for rear projection application using a TV or computer display image projector such as a Sharp brand LCD based projector 375, there is also a front projection version in which the distortion of surface 310 is directly observed from the front side, for example by camera 380, also as taught in reference 1. (copending application Ser. No. 09/435,854).

In the embodiment of FIG. 3, I have found it of use to coat the surface 311 with a partially reflecting coating as was also described in copending application Ser. No. 09/435,854. It is also generally desirable that outer surface 310 of member 315 be relatively hard, such as thin Plexiglas or Mylar.

As an alternative to providing a partially reflective coating (such as commonly done with vacuum deposition of silver or interference coatings—the latter useful if at the wavelength used for distortion determination, which additionally can be in the near infrared (e.g. 0.8 microns, where LED sources and TV camera sensitivity is commonplace), it is possible to provide on surface 311 a periodic array of zones of reflective material (for example a reflective dot or stripe 0.05 mm wide, every 1 mm), whose movement as a result of touch is detected using the electro-optical system of the invention. The projection device if desired can be programmed to minimize the effect of such reflective or partially reflective zones in the displayed image.

FIG. 4

Figure 4A:
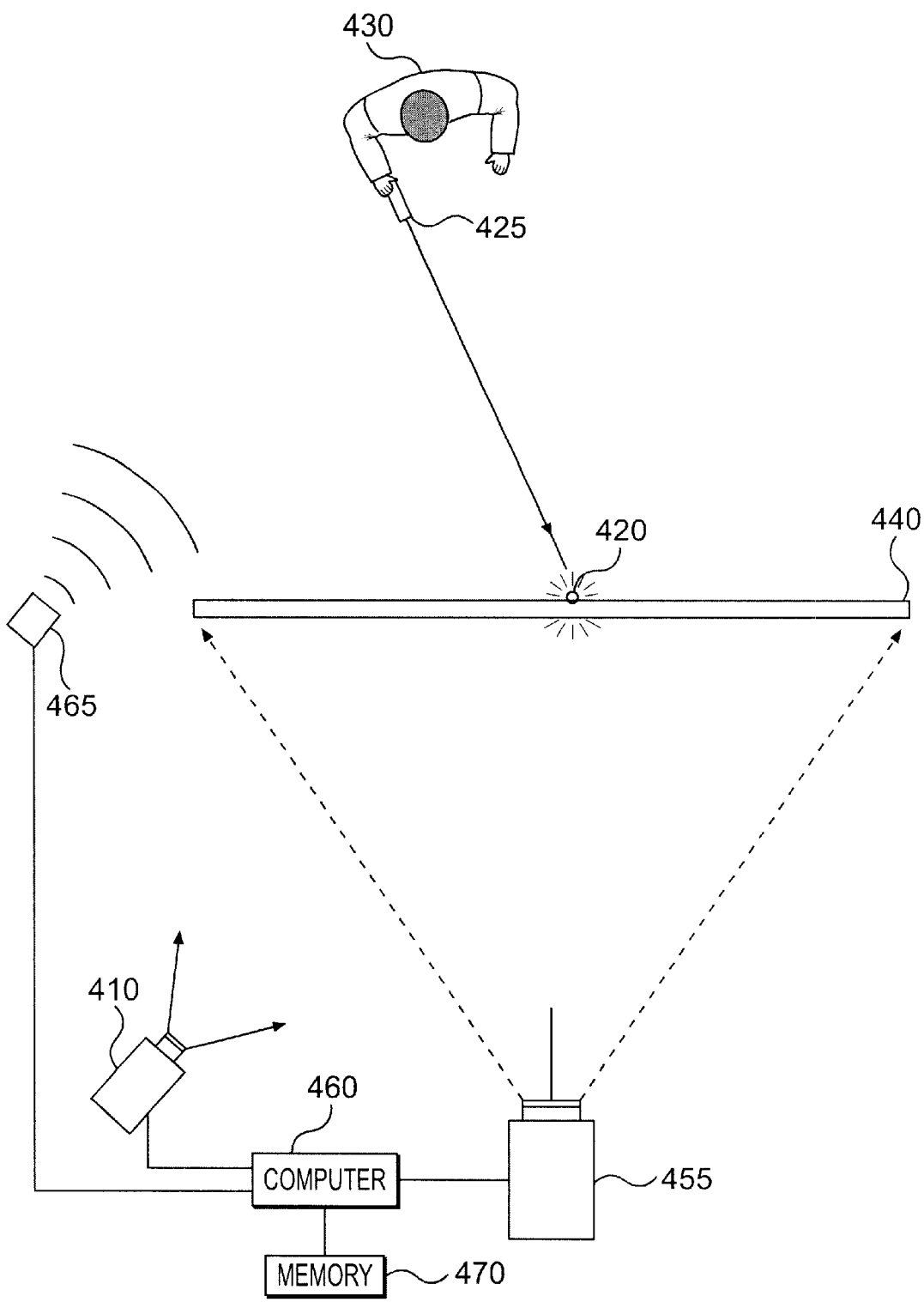
FIG. 4 illustrates the use of a TV camera based transduction using the camera for screen distortion determination similar to that of FIG. 3 with the camera used for the determination of the position of a laser pointer indication such as a spot directed by a user on the screen, particularly in response to an image displayed on the screen.
Figure 4B:
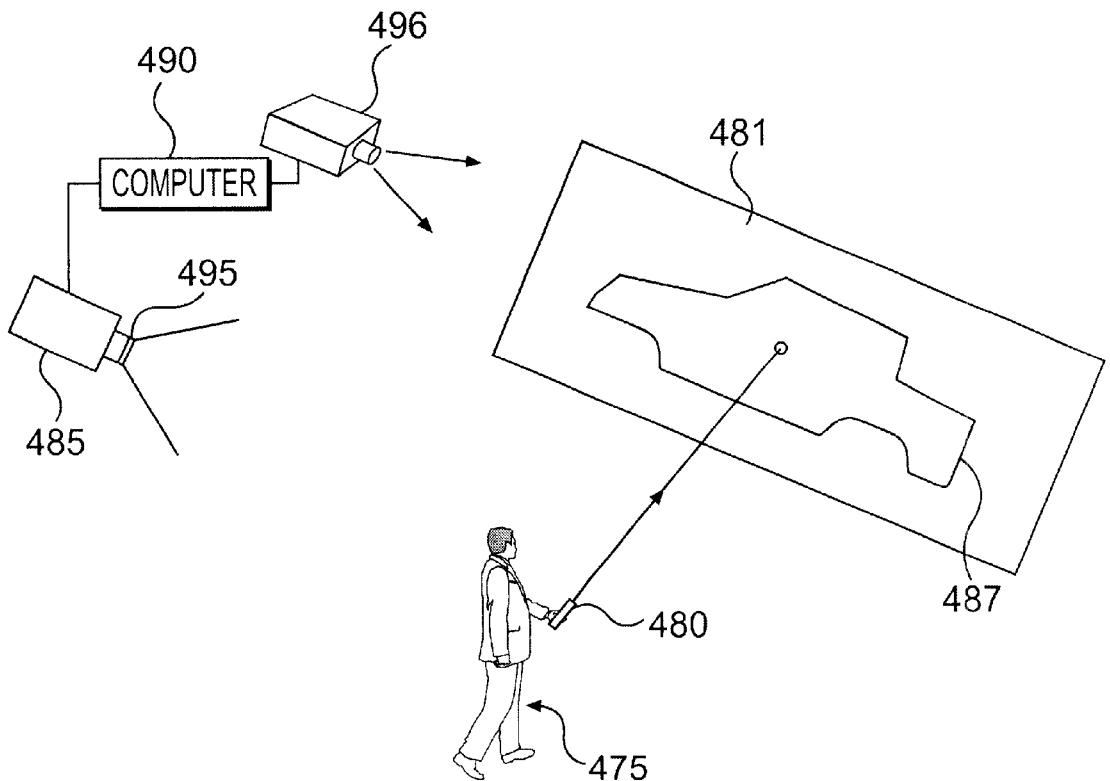

FIG. 4 illustrates the use of a TV camera based transduction of finger touch using for example camera 410 to determine screen distortion occurring on touch similar to that of FIG. 3. As disclosed herein, the camera 410 may also be used for the determination of the position of a laser or other optical based pointer indication such as a spot 420 from laser pointer 425 directed by a user 430 on the screen 440, particularly in response to an image (not shown for clarity) displayed on the screen, for example by image projector 455. For example if a pony image was displayed, a child could point a pointer at the pony image on the screen, and the program in system computer 460 could acknowledge this with audio feedback from loudspeaker 465 to the child, and if desired record in memory 470 that the child had correctly identified the pony, useful for tracking the child's learning, or recording scores for game purposes.

The optical pointer function is distinct from that of the physical touch screen indication of FIG. 3 above. Either function can exist independently, or both together. A separate camera such as 411 can alternatively be used to determine laser pointer indication.

This method of laser pointer designation is highly interesting, especially as one considers very large display screens. While one might use a finger pointing which is more natural, let's say, the actual holding of the laser pointer is not much different and the use of this on the front projection screen shown in FIG. 4 ballows almost widespread use. A person such as 475 can draw a drawing 487 with a laser pointer 480 for example by successively tracing it on display screen 481 where the successive laser pointer indications on the screen are digitized with the camera system 485 comprising one or more TV cameras connected via for example an IEEE 1394 firewire connection to computer 490 as shown, equipped to digitize the camera inputs. This allows one to draw modifications for example sitting in a conference room on to a drawing and have this digitized by the camera.

The camera can optionally can be equipped with a laser wavelength bandpass filter such as 495 in front of it to make it easy to detect the position laser spot anywhere on t he big screen, even in bright light surroundings. In a rear projection application such as depicted in FIG. 4a, the brightness of the laser alone is often significant enough to allow reliable detection.

Computer 490 also controls the front projector 496, such that detected laser spot indications from the digitized camera image, can be used to modify software used to generate the image on the screen in what ever manner desired, for example to make a car design larger in a certain area, or to inject a new line on the drawing or whatever.

A camera such as 485 to determine laser pointer indications on a front projection screen, can also be used to see datums on objects in front of the screen as well, as discussed in FIG. 1 and referenced copending applications for example. These can include natural features of the person 475, such as fingers, hands, or specialized datums such as retroreflectors generally located on apparel or extremities of the user. Combined also can be a camera to determine laser pointer location and the screen deflection or other characteristic of touch or other contact with the screen. The camera can also determine location of target datums on the object as well as laser pointer indications, and other things as well.

FIG. 5

Figure 5:
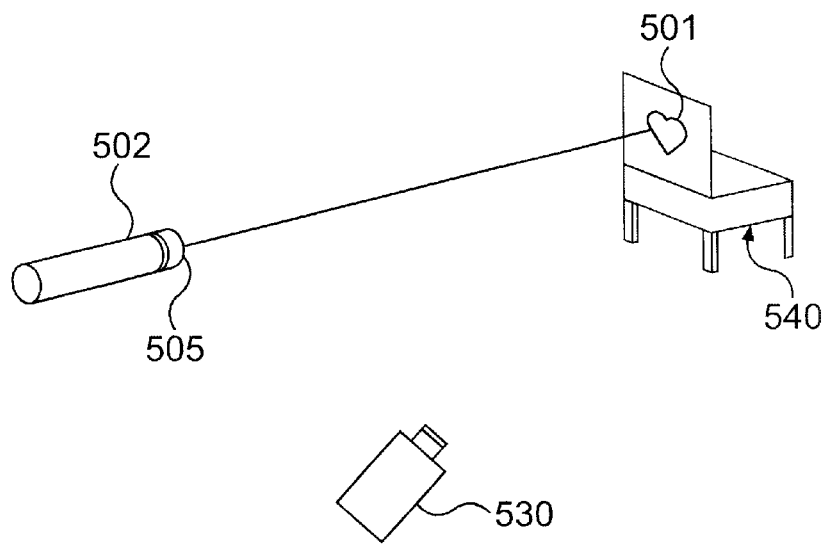
FIG. 5 illustrates a variation of FIG. 4 in which the laser spot is a spatially encoded to carry information that is itself then sent to the camera system.

FIG. 5 illustrates a variation of FIG. 4 in which the laser spot is a spatially encoded to carry information. Such information can be in the form of a shape (such as a heart 501 projected by laser pointer 502 whose beam is transmitted through grating 505), an alphanumeric character, or anything else desired. It is also foreseen that such information can be easily changed by the user, either by changing fixed lasers, selecting different lasers with different spatially encoded holographic gratings or by having a turret of such gratings in front of a single laser. The color of the laser can also be changed, with certain colors signifying desired actions. Tunable wavelength lasers make this easier today.

The information can be projected directly on an object, or on a front or rear projection screen displaying other information. The projected information can also be sensed as in FIG. 4, using a TV camera such as 530, viewing an object such as a chair 540, or alternatively a screen such as 481 on which the information is projected.

FIG. 6

Figure 6:
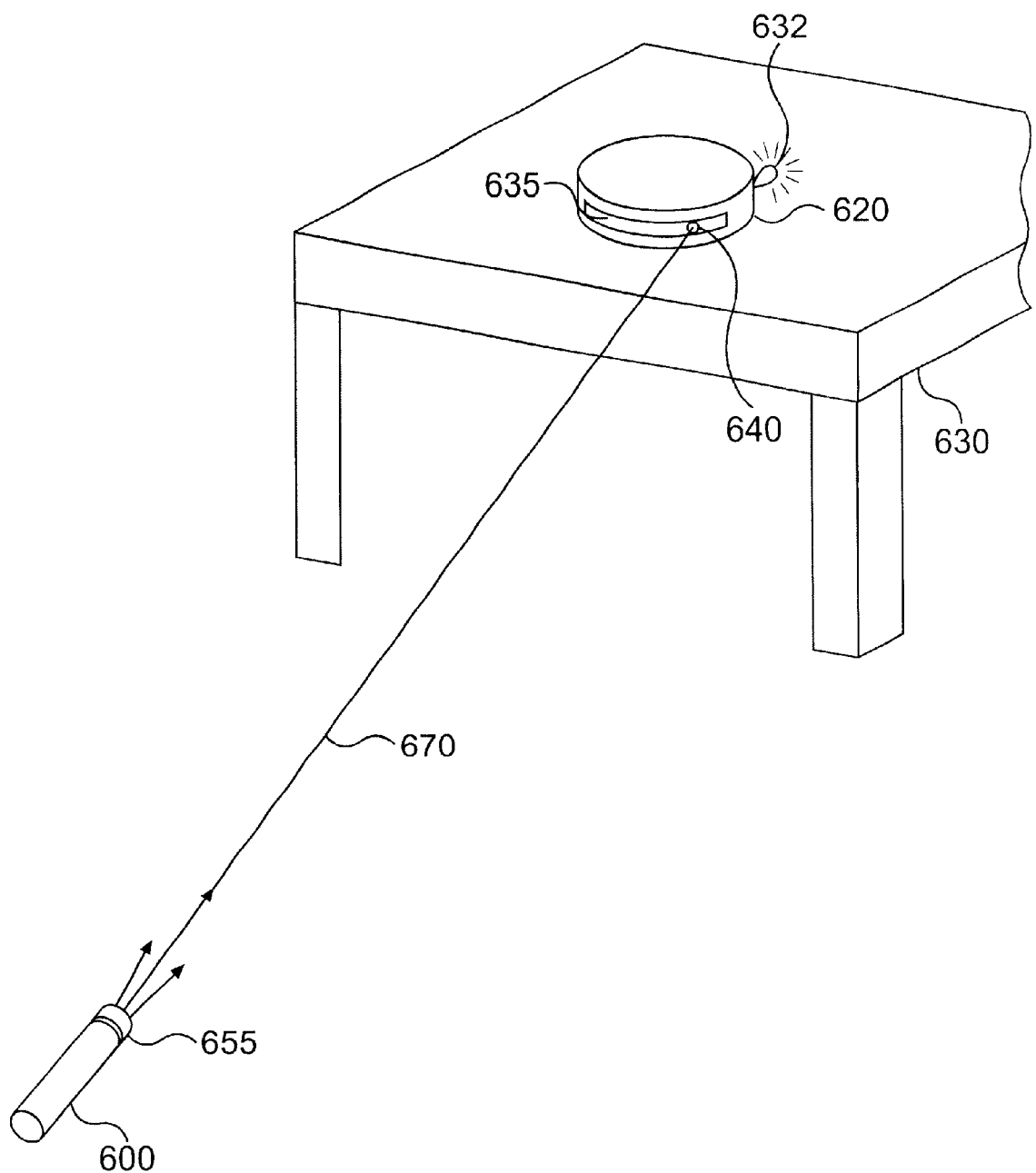
FIG. 6 illustrates an embodiment using laser pointers for acquaintance making purposes, including the use of the laser pointer to an image to designate an image on a television screen using the invention of FIG. 4 or 5 above.

FIG. 6 illustrates embodiments using laser pointers for acquaintance making purposes. This embodiment of the invention is particularly illustrated here for social purposes, but any application to which it useful is contemplated.

In particular, it is adapted to signaling one's indication for wishing to meet a person particularly of the opposite sex for the purpose of dating, etc. It more particularly concerns the use in a bar, restaurant or other social scene and using a laser pointer or other means for indicating information on the laser beam so pointed to point at the person at another table or across the room in a way that would indicate an interest.

A common problem in social interaction is to find someone of the opposite sex to start a dialogue with. This is a famous problem for persons typically males who need to approach females for this purpose. It is difficult because often the females are in a group and it makes it more embarrassing and in any case, there's always the fear of rejection.

I am roughly aware of various types of radio transponders and so forth for dealing with this issue that have been proposed in Japan, for example where a transponder on a girl would indicate her availability and it would match up with the transponder signals of a guy.

However, this particular invention is more direct because it concerns the actual pointing in an area at or near the person in question with a signal. Much as you might wave your hand or do something else, but in this case it's subtle and less embarrassing. For example, if one sits in a crowded restaurant and waves their hand in the air at somebody, everyone sees that, where as if you aim a laser beam at the coffee cup of the person in question, no one sees it but the person in question and the company they are with. This is a major difference.

The other question is what information does the laser beam carry? Clearly in the first case of the invention, one simply signals with a laser beam period. In this case, the person looks back to see who is sending the signal, but does one know what the signal means?

In the second case, similar to FIG. 5 above, one sends for example, a heart or some other spatially extending information signaling the particular idea. This can be purposely aimed to project onto a person's clothing, or on a glass or whatever on a table in a bar or restaurant, for example.

In addition, one can project information that actually carries data, such as contact information details. For example, as the cellular phone becomes more prevalent, one idea is to project a persons cell phone number with a holographic grating or other mechanism for generating such a pattern at a distance. If you have your cell phone on, and so does the other party, dialog can be initiated immediately. In addition, the person doesn't have to embarrass themselves, by looking back around to see who shot the beam, so to speak.

It is true that this sending message could be sent by radio control but the question is how could you decide to whom it was sent? This gets back to the other invention where only those people who wish to have something sent would have the transponder on, but again you only wish to send it to one particular person. This is why the laser becomes useful.

Another idea is to send a message concerning one's e-mail address. This then allows the person to correspond later, in an even less obvious way without even having to talk in person.

Another idea is Transponders at the other end that would beep back. For example, you could put a cigarette lighter that actually was a transponder on the edge of your restaurant table. If someone hit that with a laser beam, it would light up or send a beam back or do something. This could be an indicator for example. Certainly something on one's clothes would be another thing. Or something on a purse, or something on another article that might be obvious for the other person to shoot at for example.

In addition, colors can mean different things. For example, blue could be something like "lets dance", or red could be let's leave, or whatever it is. Progress in colored lasers will make this a reality soon, insofar as laser sources for the indication are concerned.

And then we come to whether we could also modulate the laser, which is easy technically, but more costly. For example, lasers modulated at a certain frequency would interact with detectors and say located in a purse, it would then give out a certain response, either to the person being signaled at to respond back.

One can imagine that in FIG. 5, a laser pointer is being held in the hand of the signaler who aims it at the coffee cup of a potential acquaintance sitting at table. The method here is that the user aims the laser and triggers it to send an optical indication signal to hit the coffee cup or any other point (such as the chair illustrated in FIG. 5) that is visible to the potential acquaintance, thereby in this simple case, signaling a message to look at the person who is signaling.

As also discussed relative to FIG. 5 a holographic or other pattern-generating element on the front of the laser 502 can be used to make such a signal but with a message carried spatially in a more descriptive manner. This message being either a pattern or a word or even a phrase, such as "let's get together" or something, or conversely a phone number, e-mail address, or other useful piece of information.

FIG. 6 is an embodiment of a transponder device responsive to a laser directed signal such as that from laser 600 at items on the potential acquaintance's table for example, ashtray 620 placed on the table 630 that has the ability to signal back to the potential acquaintance or, in another version, to be programmed to signal to any sender (or a sender having a particular code) that the person is interested, or not interested, as the case may be.

But what could this signal back be? It could either be a modulated signal that can be detected through a modulated infrared or radio respondent means for example, or it could be a visible signal capable of lighting up and showing that the person is interested. This is shown by LED 632, attached to ashtray 620 and responsive to the signal from photovoltaic detector 635 connected to a readout capable of energizing said LED on receipt of a desired signal, such as, that produced by laser beam 640 from the laser pointer 600. The Detector and led are driven and powered by circuit and batteries not shown. The detector would be responsive over a wide range of angles, ideally 360 degrees. Alternatively multiple detectors facing in different directions could be used. This would also give an indication of the direction from which the signal came. Each detector could have a corresponding LED as well, making the indication easy to see. Or other means of communicating the arrival and/or direction of a signal could be used, such as generating an audio signal or radio signal.

Laser 600 can also be equipped with modulator 655 modulating the laser beam with a signal 670 that is responsive to the needs of the signaler. For example, if a key energizing the modulator is pressed three times, the unit is set up to modulate at a frequency that will be demodulated at the other end and provide an indicated meaning that the signaler wants to meet. This signal could be provided by having the LED 632 just blink 3 times in rapid succession for example.

A return signal to signal 670 could indicate that the signaler can't meet right now but would like to meet at some time in the future and would signal the person automatically modulated on the beam, the person's phone number or cell number, e-mail address, or whatever. This makes it easy for one to have then an ashtray or handbag that has the receptor for this particular number.

The issue there though is does one want to really meet this person at all since it's relatively easy in some cases to receive the signal? For example, and only if one look's back to see where the signal came from can you ascertain whether you want to meet the person. At this point in time, the signal could also convey data as to what the person is like; their age, weight, height, physical dimensions, educational background, all of that could be encoded on the signal that's transmitted. This of course, gives a lot more data to the receiving person from which they can make a decision as to whether they want to signal back. This readout can be made either with an automatic voice actualization or it can be made into a computer system or whatever. For example, that computer sitting on your desk can do this.

None the less, how does one actually see who is sending the signal? The more obtrusive the laser signal is, the less discrete and a preferred goal of this invention is to provide a discrete method of signaling. The whole point of using a laser beam is that it is very discrete because no one can hear it, see it, or whatever—except in a region near an impacted object or in the direct line of sight. For this reason, a mechanism may be desirable to look back along the line of sight. An optical system buried in a purse, handbag, ashtray, or whatever can do this.

Another neat idea is to have lights over each table. These lights would be energized with the laser pointer, which would be an easy shoot from a long distance, and then they could light up with either the message carried by the laser pointer or some standard message.

Another laser pointer idea is to point at a screen on a projection TV and then sense that from behind using a camera. This was disclosed in FIG. 4 for other purposes.

When you do point at the screen like that, you can just shoot the spot at whatever the image is that appears on the screen and correlate the image of the moment or the other text box icon or whatever to the pointing indication. Or you can also project some sort of message that can be read by the camera. This message would then be transmitted either just directly up onto the screen which requires no one else's at all or actually machine read "character . . . " and utilized in that way as information into the computer. In other words, the laser would project a specially encoded message of the users once rather than the typical thing which is a modulated message.

The alternative of a modulated message is also possible where the laser can put out any sort of pulse or frequency modulated code or amplitude either and some sort of detective system read that. The simplest thing is to have a single analog sensor looking at the back end of the screen to demodulate the signal and tell which laser used (in a room full of potential signaling users) or what signal was encoded in the modulated message.

Another idea is to have a lighting fixture over a table that would receive the encoded messages either encoded in a time based fashion (pulse width, pulse spacing, frequency, etc) or spatially encoded. The spatially encoded one has the advantage in that it can be done without any sort of electronic system. In other words, the human recipient of the message can see it directly. However, it's less versatile as to change data you have to change the spatial encoded masks, be they holographic gratings or whatever.

One can generate such a phase mask through other means through what have historically been called light valves, but it's complex.

The goal here is to try to reduce this to the simplest type of system useful by large numbers of people.

Another embodiment of the invention may utilize a TV camera in place of single detector 635 to detect the incoming radiation from laser pointer 600. In this case, the camera system can be utilized, for example, in a handbag or whatever that would possibly have the benefit of actually presenting to the owner an image of where the laser beam is coming from.

FIG. 7

Figure 7:
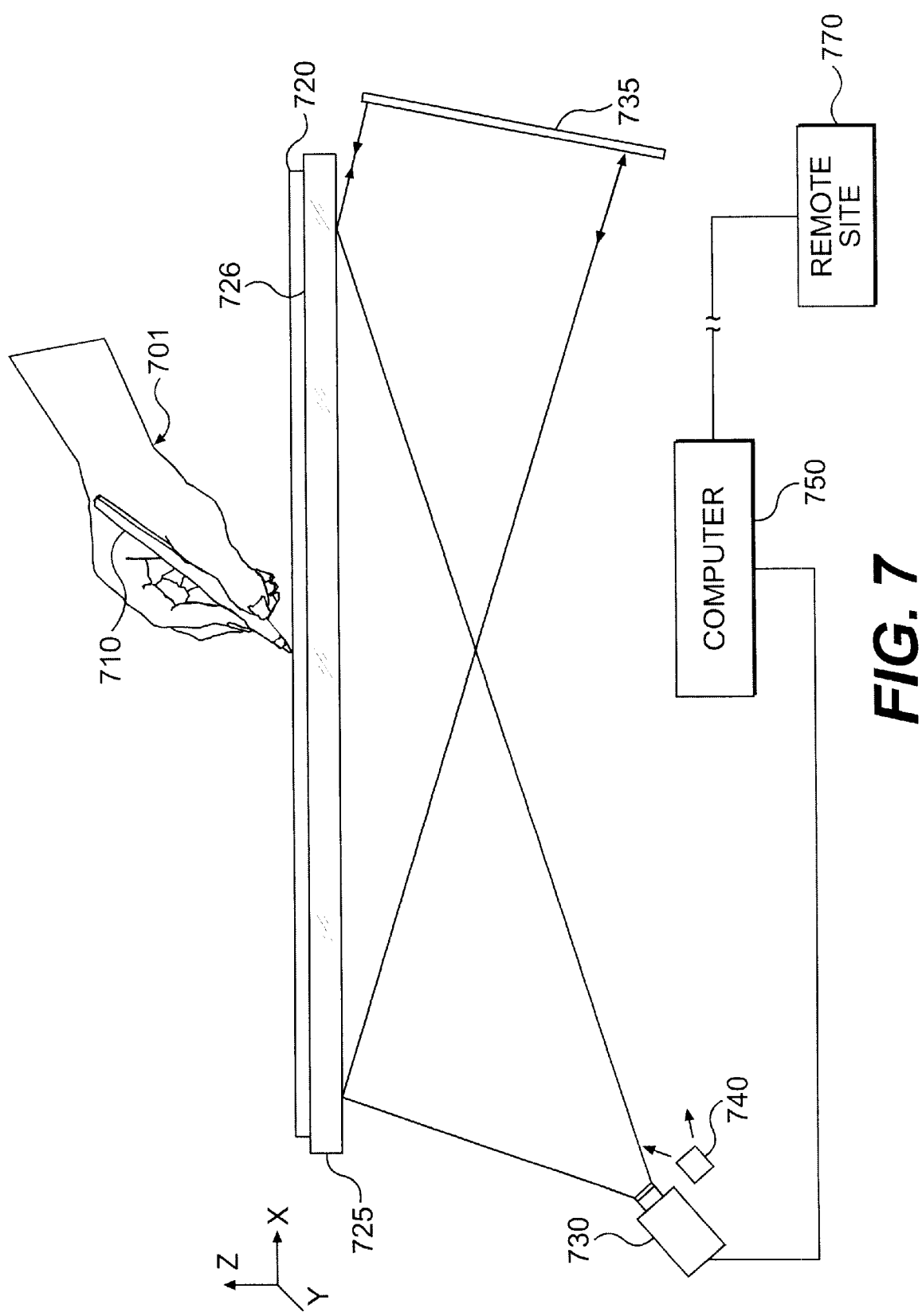
FIG. 7 illustrates Handwriting and signature recognition of sensed pencil position for internet commerce and other purpose, including a D-Sight technology based writing pad capable of distortion signature determination.

Illustrated in FIG. 7 is handwriting and signature recognition of sensed pencil position such as for internet commerce and other purpose, including a D-sight pad. As shown, user 701 with pen 710 writes his signature on paper 720, resting on glass plate 725. The backside of the paper 726, is reflective and using camera 730, retroreflector 735 and light source 740, a D sight image (using the D-Sight effect—see Ref 1 U.S. Pat. No. 4,629,319) is created which is viewed on camera 730 and analyzed where desired by computer 750. This image is a function both of the xy position of the pen, and the force used. (which force is proportional with some writing instruments, such as brushes, and papers to the width of a mark produced).

Alternatively the image generated by camera 730 can be digitized and transmitted if desired to a remote analysis site 770 for authentication. It is uniquely a D-Sight image, and cannot be copied, even if the users signature, say off a credit card receipt, was available to a forger.

If the paper a is not sufficiently reflective, then a reflective member such as saran can be placed between paper 720 and glass plate 725 and pressed or sucked in contact with it, and the reflective member(saran in this case) conforming to the writing material monitored. If D-sight is not the optical means used to monitor the force signature, then other means, such a s grid projection described in copending applications may not require reflective material at all.

Other Points

Clearly the apparatus of the above embodiments can be used to determine location of items in a scene, for example furniture in a house, for which homicide studies or insurance fraud could be an issue (see also referenced co-pending application for further detail on this application).

In addition it is noted that users may each point a laser pointer at each other, which can be detected by one or more cameras of the invention. Or each or both may point at an image on the TV screen of the invention. For example if an image was shown on the screen which both users were interested in, both could point at it with their encoded laser pointers (e.g. the girls could have her name, the boys, his) the TV camera then picks this up, and displays, possibly discretely, that each liked (or disliked that image). In this way, mutual likes and dislikes can be registered and noted.

In reference 1 the idea of a simulator was discussed for application to various airplane dashboards for example. One can also use such a touch screen for an actual airplane or car dashboard or portion thereof, and change ones mind about where certain functions were, just by reprogramming the video and touch screen of the invention.

The laser pointer of the invention could be supplanted by any optical pointer capable of easy viewing by people, and sensing. The TV camera of the invention in whatever location used for sensing laser radiation can be equipped with an interference filter for passing substantially only laser wavelengths used. (assuming all persons using the system use a similar wavelength).

What is claimed is:

1. A touch screen, comprising
   a deformable outer member on which visual information is displayed to a person viewing the screen and which is deformable by touching to provide an interaction with the person,
   a transparent inner member which is relatively more rigid than the outer member,
   a transparent medium, located between said inner and outer members, and
   an electro-optical means for determining a presence of the interaction of the person with the outer member, said electro-optical means being located in a space behind and spaced from the inner member.

2. A touch screen according to claim 1 wherein said medium is compressed when said outer member is touched.

3. A touch screen according to claim 1 wherein said medium is displaced when said outer member is touched.

4. A touch screen according to claim 1 wherein said electro-optical means includes a TV camera means to view said outer member.

5. Apparatus according to claim 1, further comprising a reflective coating on an inner surface of said outer member.

6. A touch screen according to claim 1, wherein the visual information is rear projected onto said outer member.

7. A touch screen according to claim 1, wherein said medium is a liquid.

8. A touch screen according to claim 1, wherein said medium is a solid.

9. A touch screen according to claim 7, wherein electro-optical means further includes a light source adjacent said TV camera view which projects light onto an inner surface of said outer member and a retro-reflector to which light reflected from the inner surface is directed and returned back to the inner surface for viewing by the TV camera.

10. A rear projection touch screen, comprising a deformable outer member on which visual information is displayed to a person viewing the screen and which is deformable by touching to provide an interaction with the person, a transparent inner member which is relatively more rigid than the outer member, a transparent medium, located between said inner and outer members, and an electro-optical means for determining a location of the interaction of the person with the outer member, said electro-optical means being located in a space behind and spaced from the inner member.

11. A touch screen according to claim 10 wherein said medium is compressed when said outer member is touched.

12. A touch screen according to claim 10 wherein said medium is displaced when said outer member is touched.

13. A touch screen according to claim 1 wherein said electro-optical means includes a TV camera means to view said outer member.

14. A touch screen according to claim 10, wherein the visual information is rear projected onto said outer member.

15. A touch screen according to claim 10, wherein said medium is a liquid.

16. A touch screen according to claim 10, wherein said medium is a solid.

17. A touch screen according to claim 16, wherein electro-optical means further includes a light source adjacent said TV camera view which projects light onto an inner surface of said outer member and a retro-reflector to which light reflected from the inner surface is directed and returned back to the inner surface for viewing by the TV camera.

* * * * *